United States Patent [19]

Mori

[11] Patent Number: 4,572,613

[45] Date of Patent: Feb. 25, 1986

[54] METHOD AND APPARATUS FOR ILLUMINATING A SPOT INSIDE OF A TUNNEL OF A HIGHWAY

[76] Inventor: Kei Mori, 3-16-3-501, Kaminoge, Setagaya-ku, Tokyo, Japan

[21] Appl. No.: 616,360

[22] Filed: Jun. 1, 1984

[30] Foreign Application Priority Data

Jun. 6, 1983 [JP] Japan ............................... 58-100518

[51] Int. Cl.⁴ ..................... G02B 17/00; G02B 5/14
[52] U.S. Cl. ................................. 350/265; 350/96.1
[58] Field of Search ................. 350/96.1, 96.3, 265

[56] References Cited

U.S. PATENT DOCUMENTS 4,297,000 10/1981 Fries ........................... 350/96.1 X
4,302,069 11/1981 Niemi .......................... 350/96.1 X
4,411,490 10/1983 Daniel ............................ 350/96.1

Primary Examiner—Richard A. Wintercorn
Attorney, Agent, or Firm—Jordan and Hamburg

[57] ABSTRACT

A method for illuminating a spot inside a tunnel of a highway by the use of a solar ray collecting device which is to be used to focus a solar ray and guide it into an optical conductor. The solar ray transmitted through the optical conductor would illuminate an entrance portion of the tunnel and a light-emitting portion of the optical conductor would disperse so as to gradually weaken the illumination inside the tunnel in accordance with an increase of distance between the entrance portion and a spot to be illuminated in an inner space of said tunnel.

8 Claims, 4 Drawing Figures

METHOD AND APPARATUS FOR ILLUMINATING A SPOT INSIDE OF A TUNNEL OF A HIGHWAY

BACKGROUND OF THE INVENTION

The present invention relates to a method for illuminating a spot in a tunnel of a highway, specifically that of illuminating an entrance portion thereof.

In the case of driving a car on a highway, when a driver approaches a tunnel and the tunnel occupies a sufficiently wide area in the driver's range of vision, the driver scans the road surface area from the car to the entrance and judges whether any obstacle exists on the road's surface. Then the driver proceeds while concentrating his line of vision and attention on the dark tunnel. Starting at this point, the center of the driver's line of vision is filled with darkness from inside the tunnel and his visual acuity begins to rapidly decrease. The geographical point at which the driver starts to pay attention to the entrance of the tunnel is called "the beginning attention point". According to an experiment, when the driver does not need to carefully watch any other obstacles on the road such as other cars, he usually pays attention to the entrance of the tunnel during about 80% of the time interval from the aforementioned "beginning attention point".

Meanwhile the illumination in the tunnel is weakened gradually in accordance with an increase of distance between the entrance portion of the tunnel and the spot to be illuminated in an inner space thereof. That needs to be changed depending on the open-air brightness condition. Usually in an ordinary tunnel, illumination starts at a point 10 m from the tunnel entrance in connection with the amount of existing natural light and the brightness of the illumination is controlled in proportion to the open-air brightness. However, if the brightness of the illumination apparatus such as a natrium lamp or the like is controlled in a wider range, its average life span may be shortened causing increased maintenance problems and operating costs.

SUMMARY OF THE INVENTION

It is therefore an object of the present invention to avoid the problems heretofore mentioned, specifically, a bundle of solar rays is focused by use of a lens and guided into an optical conductor cable which transmits the resultant light into the internal space of a tunnel.

Another object of the present invention is to provide an illumination method in which no brightness control is necessary and by which further maintenance costs can be eliminated.

Another object of the present invention is to use the light transmitted through the optical conductor cable for illuminating at the entrance portion of the tunnel.

Finally the purpose of the present invention is to use a solar ray collecting device which will focus a solar ray and guide it into an optical conductor.

DESCRIPTION OF THE PREFERRED EMBODIMENT

Figure 1:
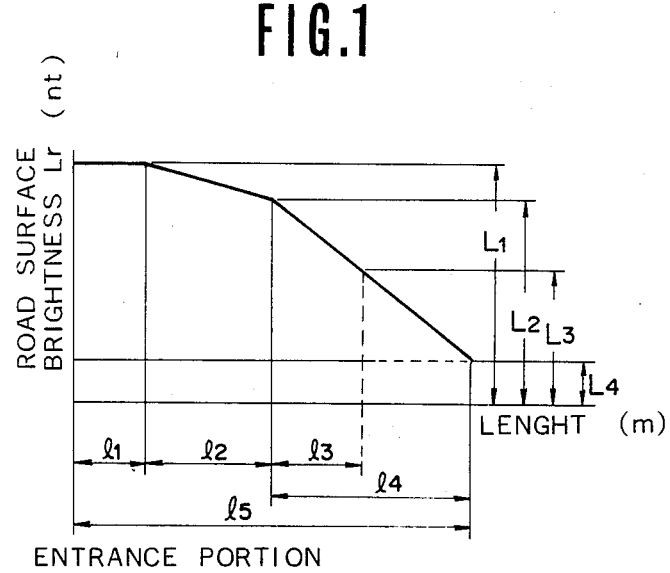
FIG. 1 is a graph showing an illumination curve at the entrance portion of the tunnel.

FIG. 1 shows an illumination curve at the entrance portion of the tunnel. As shown in FIG. 1, when the length of the entrance illumination is equal to l (m), the entrance illumination curve consists of three portions: a boundary portion $l_1$, a movement portion $l_2$, and a mitigating portion $l_3$ ($l_4$).

The road surface brightness $L_1$ at the boundary portion, the road surface brightness $L_2$ at the final spot of the movement portion, the road surface brightness $L_3$ at the final spot of the mitigating portion, the road surface brightness $L_4$ at the fundamental portion, etc. are determined in accordance with the length of the tunnel, for example, as shown in Table 1. However, $L_3$ and $l_3$ are applicable to a tunnel of predetermined length only. In such a case, the brightness of the road surface varies as shown in the dotted line portion of FIG. 1. The value in Table 1 shows the degree of brightness thereon. In the case of open-air brightness of 6000 nt, the respective values in Table 1 will be multiplied by 1.5, and in the case of open-air brightness of 3000 nt, these shall be multiplied by 0.75.

TABLE 1

| Tunnel Elongation (m) | Road Surface Brightness Lr (nt) | | | | Length l (m) | | | | |
|---|---|---|---|---|---|---|---|---|---|
| | $L_1$ | $L_2$ | $L_3$ | $L_4$ | $l_1$ | $l_2$ | $l_3$ | $l_4$ | $l_5$ |
| 75 or less | 116 | — | — | — | 40 | 0 | 0 | 0 | 40 |
| 100 | 111 | 106 | — | — | 55 | 10 | 0 | 0 | 65 |
| 125 | 105 | 91 | — | — | 55 | 35 | 0 | 0 | 90 |
| 150 | 103 | 77 | — | — | 55 | 50 | 0 | 0 | 110 |
| 175 | 99 | 67 | — | — | 55 | 80 | 0 | 0 | 135 |
| 200 | 95 | 58 | — | — | 55 | 105 | 0 | 0 | 160 |
| 250 | 95 | 47 | — | — | 55 | 150 | 0 | 0 | 205 |
| 300 | 95 | 47 | 27 | — | 55 | 150 | 45 | 0 | 250 |
| 350 | 95 | 47 | 15 | — | 55 | 150 | 90 | 0 | 295 |
| 400 or more | 95 | 47 | — | 9.0 | 55 | 150 | 0 | 135 | 340 |

As mentioned heretofore, the illumination in the tunnel is weakened gradually in accordance with an increase of distance between the entrance portion of the tunnel and the spot to be illuminated in an inner space thereof. That needs to be changed depending on the open-air brightness condition. Usually in an ordinary tunnel, illumination starts at a location 10 m apart from the tunnel entrance in connection with the amount of natural light and the brightness of the illumination is therefore controlled in proportion to the open-air brightness. However, if the brightness of the illumination apparatus such as a natrium lamp or the like is controlled in a wider range, its average life span may be shortened causing increased maintenance problems and operating costs.

The present invention was performed in order to solve the problems mentioned. Specifically, a bundle of solar rays is focused by use of a lens and guided into an optical conductor calbe which transmits the resultant light into the internal space of a tunnel. The light transmitted through the optical conductor cable can be utilized for illumination at the entrance portion of the tunnel. In such a manner, the problems mentioned above can be largely avoided. That is to say, the primary object of the present invention is to provide an illumination method in which no brightness control is necessary and by which further maintenance costs can be eliminated.

Figure 2:
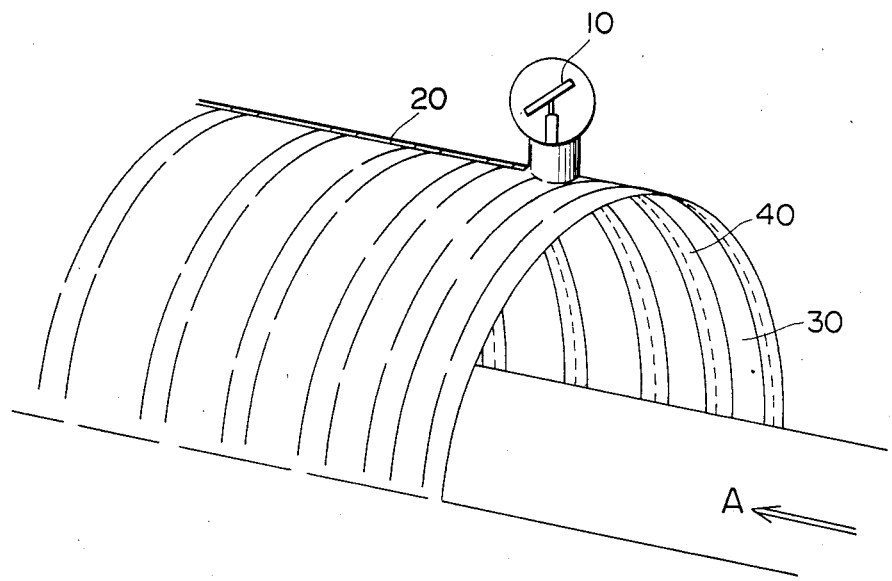
FIG. 2 is a perspective view for explaining the construction of an embodiment of the present invention.

FIG. 2 illustrates the construction of an embodiment in respect to a method for illuminating a spot in a tunnel according to the present invention. In FIG. 2, 10 is a solar ray collecting device for focusing a solar ray by the use of a lens and by guiding it into an optical conductor cable. The solar ray guided into the optical conductor cable by the solar ray collecting device is further projected into a tunnel 30 through the optical conductor cable 20. The light is emitted from a light radiator 40 at the entrance portion of the tunnel 30 to be used for illumination inside the tunnel.

Illumination at the entrance portion of the tunnel 30 is preferably performed so as to follow the illumination curve distribution as shown in FIG. 1. Various kinds of means for embodying such illumination can be thought up. For instance, a plurality of optical conductor cables can be installed on the inner wall-surface of a tunnel a shown in FIG. 2, at a predetermined distance apart and perpendicular to the car's line of motion A. More definitely, those cables are installed in accordance with the distribution (wiring) density which corresponds to the illumination curve shown in FIG. 1.

By use of an illumination device constructed in such a manner, the driver's eyesight may gradually adjust to the darkness in the tunnel when the driver enters it making it safer for driving. Moreover, since the amount of light guided into the optical conductor cable automatically corresponds to the brightness of the open-air at that time, the brightness at the entrance portion of the tunnel will automatically correspond to it. There will be no need to use a brightness controlling device as disclosed in the prior art. Consequently it is not necessary to invest much money in equipment for controlling the brightness inside the tunnel.

Further, in respect to the technology for emitting outside light transmitted through an optical conductor, the present applicant has already proposed various kinds of devices called "light radiators". When such devices are used as shown in FIG. 2, the light may be emitted in the manner shown in FIG. 3.

Figure 3:
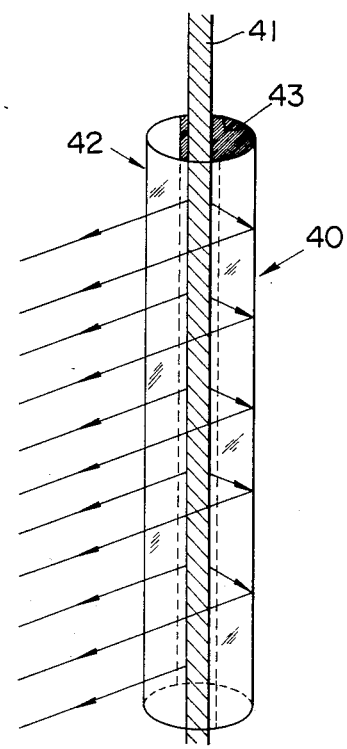
FIG. 3 is a perspective view for explaining a preferred embodiment of the light radiator used in the device.

FIG. 3 illustrates a preferred embodiment of the light radiator 40 used in the device according to the present invention. In FIG. 3, 41 is an optical conductor through which a bundle of solar rays are guided as mentioned heretofore. The optical conductor cable 20 consists of many bundles of those optical conductors 41. A notch is formed on the surface of the respective optical conductors 41 as already proposed by the present applicant, or a transparent or semi-transparent material of large refractive index is attached thereto, and the light transmitted through the optical conductor is emitted through such portions outside of it.

However, the optical conductor is very fine, specifically about 0.1 mm to several milimeters in size. Because of that fact, the optical conductor is subject to being destroyed. In practice, the optical conductor inserted into the protection tube 42 is used as shown in FIG. 3. On that occasion, if nearly half the portion of the protection tube's inner peripheral surface is constructed as a reflection surface 43, the light radiates from the light radiator 40 only in one direction. Therefore, when the light radiator is installed on the reflecting surface, as on the wall surface, it may be possible to illuminate the road utilizing the light emitted from the optical conductor. Furthermore, if the reflection surface is directed in the same direction as the moving vehicle, the light from the light radiator will not reach the driver's eyes directly so that he will not be hampered by it in any way.

An embodiment of the illumination device in which the light radiator is installed on the inner wall surface of a tunnel facing a direction which is perpendicular to the car's direction of movement is explained heretofore. While the present invention has been shown and described in relation to an illumination device placed in a tunnel, such is only illustrative and the present invention can be applied to various other devices as well. Therefore, the present invention is not limited only to the above-mentioned embodiment. For example, the illumination device may be installed in parallel with the car's progressing motion. In such a case, by changing the length of the optical conductor, the entire illumination distribution may be changed in order to satisfy the illumination curve shown in FIG. 1.

Another example is one in which a bundle of optical conductor cables is untied and the light is emitted from the outer peripheral surface of the respective optical conductors for the purpose of illuminating the tunnel as explained heretofore. It is not always necessary to until the bundle of optical conductor cables. For instance, the light may be emitted directly from the edge surfaces of the optical conductor cables for illuminating the tunnel. Even though the bundle of optical conductor cables is untied, it is not always necessary to emit the light from the outer peripheral surfaces. Furthermore, the illumination curve, as shown in FIG. 1, can also be obtained by distributing evenly the light-emitting edges of the respective optical conductors.

Another example in which a solar ray illuminates the road surface at the entrance portion of a tunnel is explained hereafter. In such a case, it may be possible to combine the afore-mentioned solar ray illumination with artificial light illumination. At least the fundamental lighting of the road's surface can be done by means of artificial light. When a solar ray cannot be utilized, for example at night, it may be possible to illuminate the road's surface by using an artificial light source.

One of the possible problems not heretofore mentioned is that the light radiated from the optical conductor may directly enter the driver's eyes and cause brightness on the wall surfaces of a tunnel and/or on the road surface by the use of radiated light. In such a case, it is not necessary to form a reflecting surface in the afore-mentioned tube 42. If the light radiator constructed in such a manner is dispersingly installed on the wall surface and/or the road surface at the entrance portion of the tunnel the desired light-distributing curve can be obtained.

Previous examples were given in which a notch is formed on the surface of an optical conductor or a transparent or semi-transparent material of larger refractive index than that of the optical conductor is attached thereto for the purpose of emitting the transmitted light outside of the optical conductor. However, it is not always necessary to perform such a procedure. The optical conductor itself leaks light to some extent. Such leaking light can also be used for illuminating a tunnel.

As is apparent from the foregoing descriptions, a solar ray is collected to obtain a desired distribution of illumination according to the present invention. When the open-air brightness varies, the brightness for road illumination also varies by comparison. Therefore, there is no need to control the brightness inside a tunnel. Furthermore, since the light emitting portion is not likely to be damaged, its maintenance will be easier and less costly. These are considered to be the chief merits of this illumination device according to the present invention.

Figure 4:
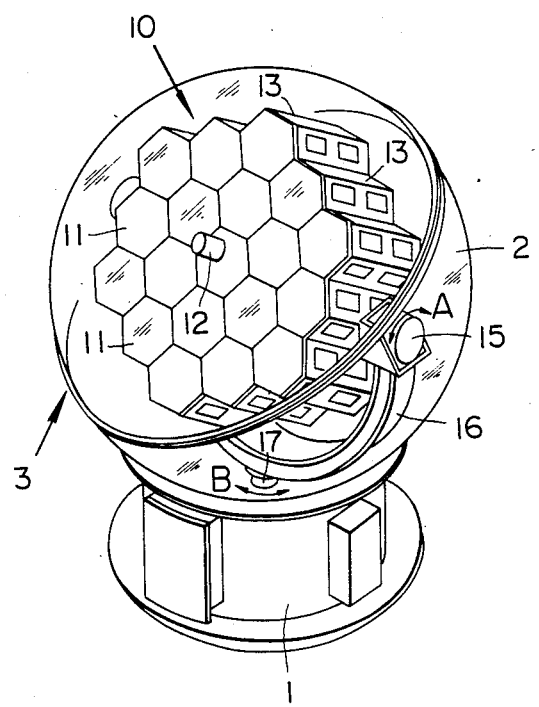
FIG. 4 is a perspective view of an embodiment of the solar ray collecting device 10 shown in FIG. 1 which previously proposed by the present inventor.

FIG. 4 is a perspective view showing an embodiment of the solar ray collecting device 10 shown in FIG. 1. In the figure, is shown: (1) a cylindrical foundation; (2) a transparent dome-shaped head; and (3) capsule constructed with those elements appropriate for use in the solar ray collecting device 10 is accommodated in the capsule 3 as is shown in FIG. 4. The solar ray collecting device 10 contains one or more lenses 11 (for example, 7 or 19) for focusing the sun's rays; a solar ray direction sensor 12 for detecting the direction of the sun; a supporting frame 13 for unitarily supporting the lenses and the sensor; a first rotating shaft (not shown) for rotatably moving the support frame 13; a first motor 15 for rotating the first rotating shaft; a supporting arm 16 for supporting the lenses 11; the sensor 12, the frame 13, the first rotating shaft and the motor 15; a second rotating shaft 17, arranged so as to cross perpendicularly to the first rotating shaft and a second motor (not shown) for rotating the second rotating shaft 17. The solar ray direction sensor 12 detects the direction of the sun and produces a detection signal which controls the aforementioned motors so as to always direct the lens (or lenses) 11 toward the direction of the sun. The solar rays focused by the lens 11 are guided into an optical conductor cable 20 (as shown in FIG. 1), the light-receiving edge of which is arranged at the focal position of the lens 11, and transmitted to the optional desired position through the optical conductor cable 20.

What is claimed is:

1. A method for illuminating the inside of a tunnel of a highway comprising the steps of collecting solar rays by focusing the solar rays utilizing a lens, guiding said collected solar rays along an optical conductor leading to an entrance portion of the inside of a tunnel, radiating light from said optical conductor to illuminate the inside of said entrance portion, varying the extent of the radiating light along the length of said entrance portion to provide gradual decreasing illumination from the entrance and extending into the tunnel such that a person's eyesight gradually adjusts to the darkness of the tunnel upon driving into said tunnel, the amount of illumination in said entrance portion being related to the brightness outside of the tunnel as determined by the collected solar rays.

2. A method according to claim 1 further comprising instaling said optical conductors on the inner wall surface of said tunnel and extending generally perpendicular to the longitudinal extent of said tunnel.

3. A method according to claim 1 further comprising illuminating the inside of said tunnel utilizing the light emitted from said optical conductor.

4. A method according to claim 1 further comprising passing said optical conductor through a protection tube, and reflecting illumination from said optical conductor onto a reflecting surface in said protection tube.

5. Apparatus for illuminating the entrance portion of a highway tunnel comprising solar ray collecting means for collecting solar rays, optical conductor means extending into said tunnel for conducting said collected solar rays to radiation light means, said radiation light means illuminating the entrance portion of said tunnel, said radiation light means being variably spaced in said tunnel to provide a variable density that decreases from the entrance extending into the tunnel to thereby provide gradual decreasing illumination from the entrance extending into the tunnel such that a person's eyesight gradually adjusts to the darkness of the tunnel upon driving into the tunnel, the amount of illumination in said entrance portion of said tunnel being related to the brightness outside of the tunnel as determined by solar rays collected by said solar ray collecting means.

6. Apparatus according to claim 5, wherein said solar ray collecting means comprises a plurality of lenses, said lenses guiding the solar rays into said optical conductor means, and sensor means on said solar ray collecting means for detecting the direction of the sun to direct the lenses towards the direction of the sun.

7. Apparatus according to claim 5 further comprising a protection tube through which said optical conductor passes, said protection tube having a reflecting surface reflecting the light from the optical conductor means into said tunnel.

8. Apparatus according to claim 5, wherein said reflection surface extends over a portion of the circumference of said protection tube.

* * * * *